Oct. 14, 1941.         H. L. ROSENTHAL ET AL         2,259,140
BAG ATTACHMENT FOR CORN HUSKERS
Filed Oct. 31, 1938

Inventors
and Henry L. Rosenthal
August Rosenthal

Attorneys

Patented Oct. 14, 1941

2,259,140

UNITED STATES PATENT OFFICE 2,259,140

BAG ATTACHMENT FOR CORN HUSKERS

Henry L. Rosenthal and August Rosenthal, Wauwatosa, Wis., assignors to Rosenthal Manufacturing Co., West Allis, Wis.

Application October 31, 1938, Serial No. 237,901

3 Claims. (Cl. 209—144)

This invention pertains generally to corn huskers, and more particularly to a blower conveyor for bagging shelled kernels, such as disclosed in United States Letters Patent No. 1,886,905.

In the patented structure referred to, shelled corn from the husking machine is delivered to a bag directly from the blower, together with dirt and other foreign matter accumulated in the machine, which is objectionable.

It is, therefore, the primary object of the present invention to improve attachments of the foregoing type by the provision of a bagger for corn huskers comprising, a blower conveyor for delivering material from the husking machine to a combined separator and bag holder, whereby the shelled kernels are bagged, and dirt, or foreign material, is discharged to atmosphere.

Incidental to the foregoing, a more specific object resides in the provision of a cylindrical shell connected with the blower conveyor for receiving material from the husking machine, and separating the shelled kernels from dirt and other foreign particles by centrifugal force, and delivering the shelled kernels to a bag carried by the separator.

Another object of the invention resides in the provision of a telescoping cylindrical separator and bag holder to compensate for varying conditions of material encountered.

A still further object resides in the provision of means for indicating when the bag is filled.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1:
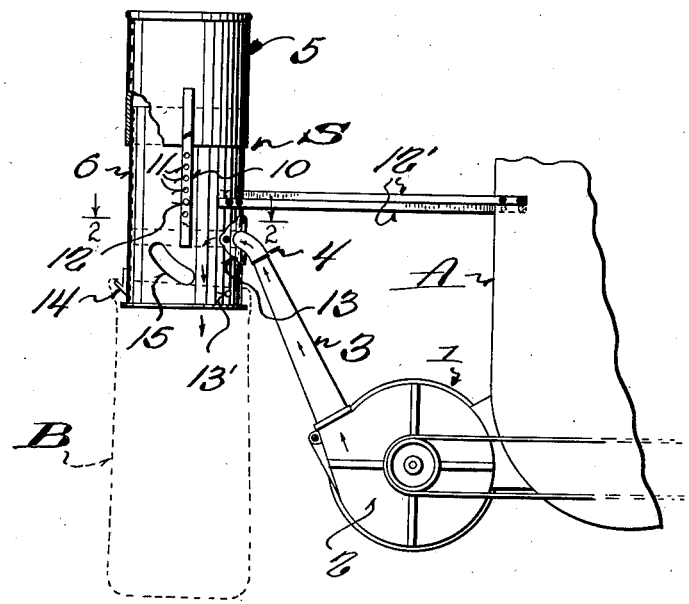
Figure 1 is a fragmentary view of a conventional corn husker with the present invention attached thereto, parts being broken away and in section to more clearly show structural details.
Figure 2:
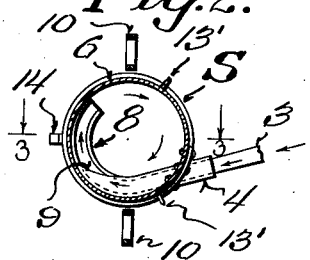
Figure 2 is a transverse section taken on the line 2—2 of Figure 1.
Figure 3:
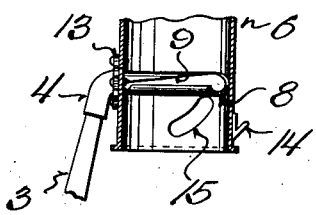
Figure 3 is a fragmentary section taken on the line 3—3 of Figure 2.
Figure 4:
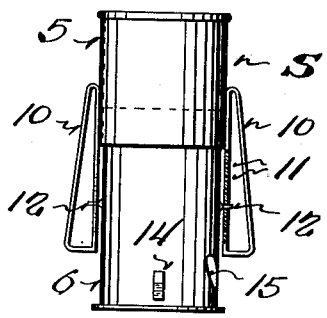
Figure 4 is an elevation of the separator and bag holder, parts being in section.
Figure 4:

Referring now more particularly to the accompanying drawing, the letter A designates generally a conventional corn husker to which a bagger blower 1, of the structure disclosed in the Letters Patent referred to above, is attached for receiving kernels of corn dislodged from cobs during the husking operation. The blower 1 consists of a casing 2 provided with a tangential spout 3 connected at its outer end to a nozzle 4 secured to the separator and bag holder S.

The separator is composed of upper and lower cylindrical telescoping shells 5 and 6, respectively, the upper shell 5 fitting over the lower section 6. The nozzle 4 is arcuate in shape, and is provided with an attaching flange 7 riveted or otherwise secured to the exterior of the lower shell 6 intermediate its ends, while the arcuate portion 8 extends into the shell, conforming to the inner periphery thereof. The upper lip 9 of the nozzle is gradually inclined upwardly from the wall of the shell 6, and terminates short of the end of the arcuate portion 8.

Diametrically attached to the upper shell 5 are resilient depending arms 10 constructed in the form of loops, and having their inner stretches provided with spaced perforations 11 for reception of lugs 12 carried by the lower section 6. By springing the arms 10 outwardly, to release the same from the lugs 12, the upper shell 5 may be adjusted upon the lower section 6, and then locked in adjusted position. The purpose of this adjustment in the height of the separator is to compensate for varying conditions of material. For instance, the height of the separator must be sufficient to prevent the discharge of kernels of corn over the top of the separator, and at the same time low enough with relation to the nozzle 4 to permit dirt and other foreign matter to be discharged over the lip or top edge of the upper section. Because the kernels vary in size and weight, adjustment is essential to meet such conditions.

The lower section 6, which in addition to being carried by the blower, is also supported by brackets 12' connecting the blower with the husking machine A. The bag B for receiving the shelled kernels from the separator, indicated in dotted lines in Figure 1, and is attached to the lower section 6 by pins or projections 13 and a hook 14, carried by the lower section 6 adjacent its bottom edge. This arrangement facilitates attachment and removal of the bag, in that it is merely necessary to pull the bag over the lower end of the separator, allowing the pins 13' to project through the same, and then hook the front end of the bag over the hook 14.

In order to indicate when the bag has been filled, an inclined slot 15 is provided in the wall of the lower shell, extending upwardly from a point adjacent the bag, and terminating below the nozzle. Inasmuch as the arcuate nozzle imparts circular movement to the kernels, when the bag is filled, and the level of corn reaches the lower end of the slot 15, additional kernels are discharged through the slot, indicating to the operator the necessity of substituting an empty bag.

Furthermore, in the event that the operator inadvertently fails to remove the bag B when the same is filled, the slot 15 prevents accumulation of corn within the separator, and subsequent backing up through the spout 3 to the blower, which would result in damage to the equipment, and churning and mutilation of the kernels.

In view of the foregoing explanation, considered in connection with the accompanying drawing, it is believed that the operation of the present invention will be apparent, in that the shelled kernels of corn, together with dirt and foreign material from the husking machine, are delivered to the separator S by a forced blast of air from the blower 1, and because of the arcuate portion 8 of the nozzle 4, a circular movement of air and material is set up within the separator. Due to the weight of the kernels, the same eventually drop into the bag supported upon the separator, while the air, following a line of least resistance, travels upwardly in a spiral path, carrying with it the lighter dirt and foreign material, to eventually discharge the same over the upper edge of the top section 5. Although the blast of air may be of sufficient force to initially carry kernels upwardly, the circulation loses its force and eventually permits the kernels to drop before reaching the top edge of the separator.

From the foregoing, it will be seen that an exceedingly simple, inexpensive, and efficient separator and bagger has been provided for husking machines, which not only delivers the shelled kernels of corn to a bag in clean condition, but also indicates to the operator when the bag is filled. Further, variations in material encountered are compensated for by the adjustment of the telescoping sections.

We claim:

1. A bagger and separator for corn huskers comprising, a blower for receiving material from the husker, a discharge spout carried by the blower, a tubular separator shell and bag holder, and a nozzle carried by said spout and provided with an arcuate portion extending into and around a portion of the inner wall of said shell to deliver material into said shell in a circular path, the top of said nozzle terminating short of its discharge end.

2. A bagger and separator for corn huskers comprising a blower for receiving material from the husker, a discharge spout carried by the blower, a separator comprising upper and lower telescoping shells, means for locking the shells in adjusted position, a nozzle carried by said spout and including an arcuate portion extending into the lower section of said separator intermediate its ends to deliver material to said section in a circular path, the upper portion of said nozzle terminating short of its discharge end, said lower section having an inclined slot below said nozzle, and projections carried by the lower section for suspending a bag below said slot.

3. A bagger and separator for corn huskers comprising, a blower for receiving material from the husker, a discharge spout carried by the blower, a separator comprising vertical tubular upper and lower telescoping sections, means for suspending a bag from the bottom of the lower section, and a nozzle carried by said spout and provided with a substantially horizontal arcuate portion extending into and around a portion of the inner wall of said separator to deliver material to said separator in a circular path, said lower section being provided with a peripheral discharge opening below said nozzle.

HENRY L. ROSENTHAL.
AUGUST ROSENTHAL.